United States Patent [19]
Spirit et al.

[11] Patent Number: 5,298,965
[45] Date of Patent: Mar. 29, 1994

[54] OTDR USING DISTRIBUTED OPTICAL AMPLIFICATION IN OPTICAL WAVEGUIDE UNDER TEST

[75] Inventors: David M. Spirit, Melton; Lutz C. Blank, Colchester, both of England

[73] Assignee: British Telecommunications public limited company, London, England

[21] Appl. No.: 834,293

[22] PCT Filed: Jun. 22, 1990

[86] PCT No.: PCT/GB90/00961
§ 371 Date: Feb. 24, 1992
§ 102(e) Date: Feb. 24, 1992

[87] PCT Pub. No.: WO90/15979
PCT Pub. Date: Dec. 27, 1990

[30] Foreign Application Priority Data

Jun. 22, 1989 [GB] United Kingdom ............... 8914364
Jul. 1, 1989 [GB] United Kingdom ............... 8915165

[51] Int. Cl.⁵ .................................................. G01N 21/88
[52] U.S. Cl. .................................................. 356/73.1
[58] Field of Search ...................................... 356/73.1

[56] References Cited

U.S. PATENT DOCUMENTS 5,013,907  5/1991  Bateman ...................... 250/227.12

FOREIGN PATENT DOCUMENTS 186299    7/1986  European Pat. Off.
1-142435  6/1989  Japan ................................ 356/73.1
2175766  12/1986 United Kingdom.
2182222   5/1987  United Kingdom.

OTHER PUBLICATIONS

Spirit et al, "Raman-Assisted Long, Distance Optical Time Doman Reflectometry", Elec. Ltrs. vol. 25, No. 25, Dec. 7, 1989, pp. 1687-1688.

Blank et al, "OTDR Performance Enhancement Through Erbium Fibre Amplification", Elec. Ltrs. vol. 25, No. 25, Dec. 7, 1989, pp. 1693-1694.

Blank et al, "Optical Time Domain Reflectometry on Optical Amplifier Systems", J. Lightwave Technology, vol. 7, No. 10, Oct. 1989, pp. 1549-1555.

ECOC'87, Technical Digest, vol. 1, 1987, Y. TGamura et al: "Fiber raman amplifier module with semiconductor laser pump source", pp. 62-65.

Primary Examiner—Vincent P. McGraw
Attorney, Agent, or Firm—Nixon & Vanderhye

[57] ABSTRACT

Apparatus and a method for increasing the optical measurement range in OTDRs in which amplification is used to amplify the OTDR pulses launched into a waveguide. The waveguide may be part of a waveguide or fiber under test and the gain is distributed and substantially balanced by propagation losses so that the maximum signal level returning to the OTDR is not substantially greater than in the absence of the amplification, thereby not requiring enhanced electrical dynamic range of the receiver. Raman amplification is particularly suitable. The signal returning to the OTDR is amplified as well as the outbound signal.

22 Claims, 4 Drawing Sheets

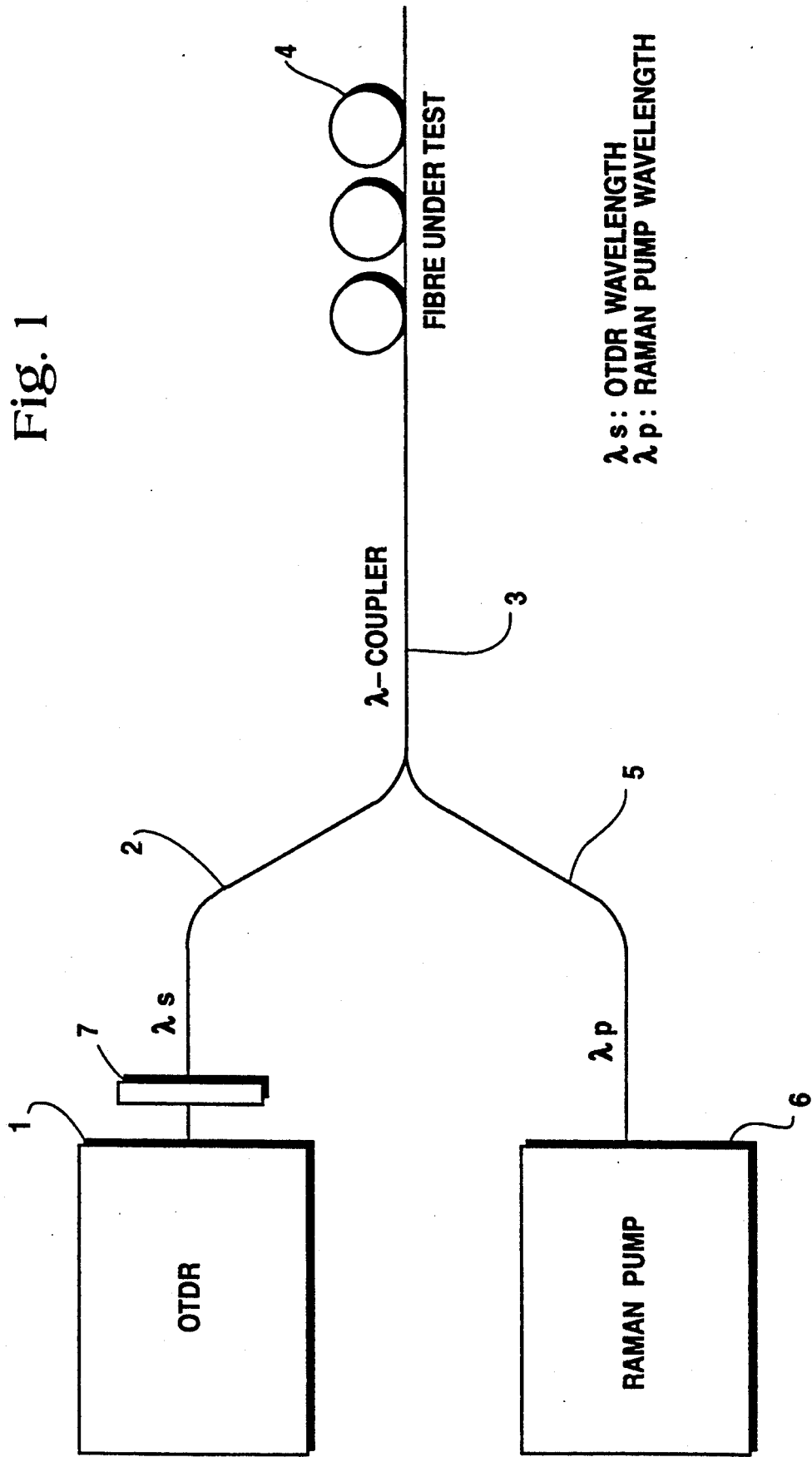

OTDR USING DISTRIBUTED OPTICAL AMPLIFICATION IN OPTICAL WAVEGUIDE UNDER TEST

This invention is related to copending U.S. application Ser. No. 07/541,973 filed Jun. 22, 1990.

This invention relates to optical Time Domain Reflectometry (OTDR), and especially to enhancing the measurement range of OTDR equipment.

In OTDR an optical pulse is launched into an optical fibre (or more generally into a waveguide; in this specification the expression 'fibre' is used to include the more general case of a waveguide as well as optical fibres) and backscattered signal returning to the launch end is monitored. In the event that there are discontinuities such as faults in the fibre, the amount of backscattering increases and this is detected in the monitored return signal. Backscattering and reflection also occur from elements such as couplers and so the monitored signal is usually compared with a reference, new peaks and other changes in the monitored signal level being indicative of changes in the fibre path, normally indicating a fault. The time between pulse launch and receipt of the backscattered pulse is proportional to the distance along the fibre to the source of the backscattering, and so OTDR is a useful technique for fault location. However there are presently distance limitations on how far it is possible to measure along a fibre. One of the limitations is the dynamic range of the receiver which has to be sufficiently sensitive to detect the low level of backscattered light returning from the more distant part of the fibre, but also capable of receiving, without damage, much greater intensity reflection and backscattering from fibre locations close to the launch end. In practice OTDR receivers have a 60 dB optical dynamic range, which requires the electronics to have a twofold dynamic range of 120 dB resulting from the optical to electrical conversion. Optical test signals from the OTDR travelling along the fibre are attenuated in both the forward direction (before backscattering) and in the return direction after having been backscattered. This means that the optical one-way measurement range is limited to 30 dB by an electronic dynamic range of 120 dB.

It is desirable to be able to detect faults along fibre of a length exceeding that equivalent to 30 dB, there already being lengths equivalent to 40 dB in existence and further increases being probable. At present it is necessary to utilise OTDR measurements from both ends of a 40 dB span in order to test the full span, and this arrangement is not always convenient, and in any event requires more time and movement of, or additional, equipment.

Increasing the launch power of the pulses would be one way to extend the range of OTDR by increasing the received backscatter from the remote part of the fibre, but this also increases the backscattered and reflected intensity close to the launch end and imposes too great a demand on the optical and electronic, or processing dynamic range of the OTDR.

It is known in the art (GB 2182222A) to provide localised amplification to an OTDR signal pulse at a predetermined point along the fibre length, remote from the launch end, in order to increase the backscatter at this particular point. This method does not provide a solution to the problem of increasing the optical measurement range of an OTDR because the amplification provided to the signal is localised to a point and is insufficient. The amplification provided is fundamentally limited because the length of fibre in which it takes place is short and because only the forward travelling signal is amplified.

An object of the present invention is to enable increased optical measurement range, with particular usefulness over long spans, without requiring a substantially enhanced processing dynamic range.

Accordingly a first aspect of the invention provides an optical time domain reflectometer comprising a source of optical pulses, means for launching the optical pulses into a waveguide and means for optically pumping the waveguide to produce gain at the optical pulse wavelength, characterised in that the gain is distributed over a substantial length of the waveguide.

A second aspect of the invention provides a method of increasing the measurement range of an optical time domain reflectometer, the method comprising launching an optical pulse into a waveguide and optically pumping the waveguide to induce gain of the pulse over a substantial length of the waveguide.

The invention is now described by way of example with reference to the accompanying drawings in which:

FIG. 1 s a schematic diagram of an embodiment of the invention.

Figure 3:
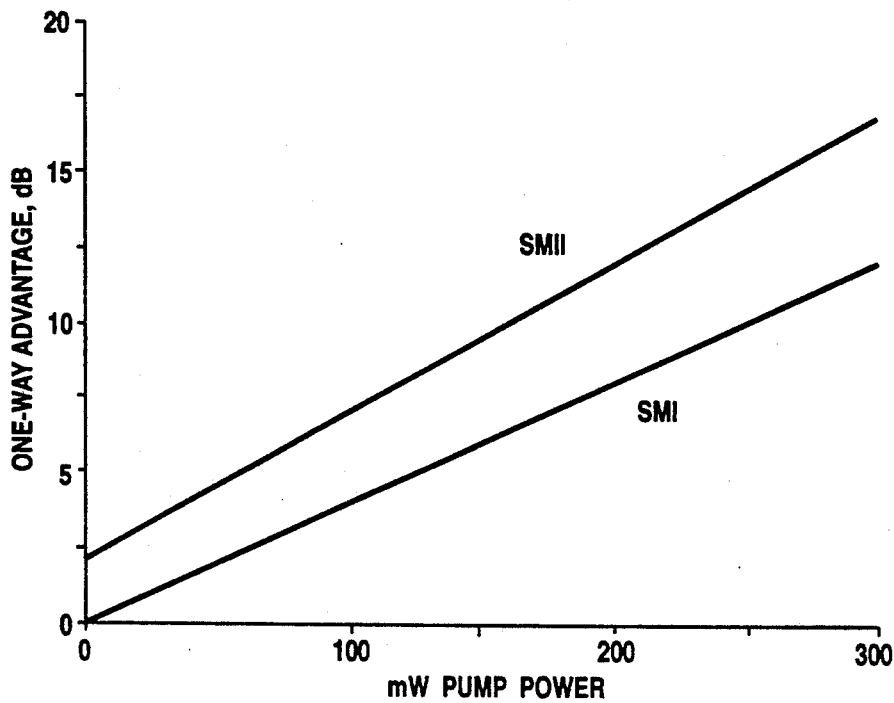
FIG. 3 is a graph of optical dynamic range advantage using the invention on different fibre types.
Figure 5:
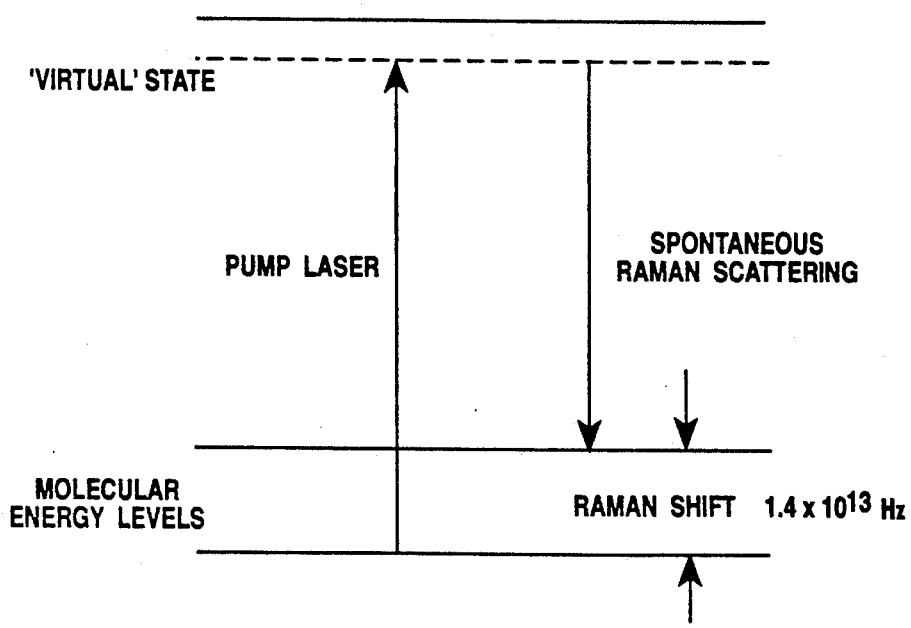
Figure 4A:
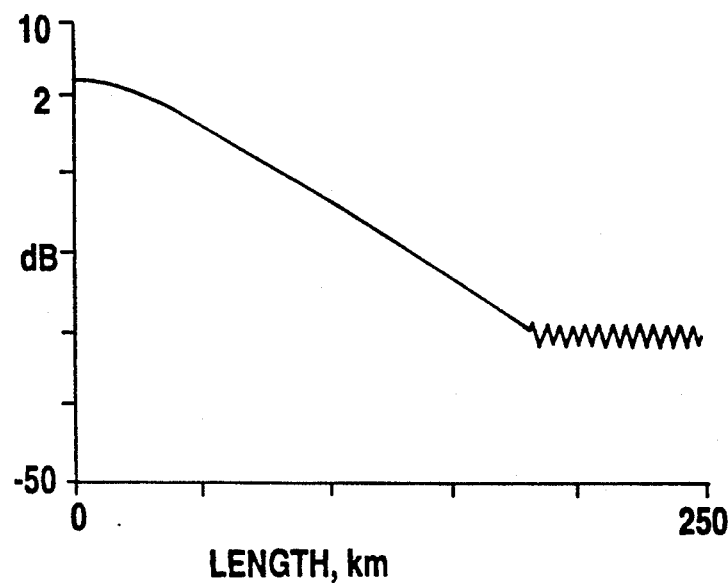

FIGS. 4a and b shown OTDR traces utilising the invention on a different fibre type from that used for FIG. 3 at two different optical power levels; and FIG. 5 is a Raman scattering energy level diagram.

Referring firstly to FIG. 1, a modified Hewlett Packard HP8145A OTDR 1 was connected via an optical filter 7 to one input arm 2 of a wavelength division multiplexer (WDM) coupler 3, which was in turn connected to a fibre under test 4. The standard Hewlett Packard OTDR is supplied with a 1.53 micron wavelength laser source, but for this embodiment of the invention it was modified by replacement with a 1580 nm wavelength laser package. The second input arm 5 of the WDM coupler was connected to a 1480 nm pump laser 6, which could be any suitable laser such as a 1.48 micron semiconductor laser module or an F-centre laser. The semiconductor laser is preferred for reasons of cost, compactness and portability. Initially the pump power was 100 mW.

Within the fibre under test the pump power is absorbed by molecular excitation to a virtual energy state as shown in FIG. 5. The molecules then subsequently emit, as spontaneous Raman scattering, the excess energy between the 'virtual' state and the energy of the excited quantum state which the molecule adopts. The spontaneous Raman emission is of lower energy than the pump energy, the difference corresponding to the energy difference between the ground and excited quantum energy level of the molecule. In optical fibres this difference (or Raman shift) is $1.4 \times 10^{13}$ Hz which, in the spectral range of interest (ie to obtain stimulated Raman emission at 1500 nm wavelengths) corresponds to a 100 nm increase in wavelength from pump wavelength to stimulated Raman emission wavelength.

In the present invention the pump wavelength and OTDR laser wavelength are selected at 1480 nm and 1580 rm respectively so that the OTDR pulse wavelength is the same as the stimulated Raman scattering wavelength and then the OTDR pulse will stimulate Raman emission and be amplified, this mechanism being termed herein Raman amplification.

Returning to the FIG. 1 embodiment, the optical power input by the pump 6 is at least an order of magnitude larger than the peak pulse Dower from the OTDR laser. The continuous wave (CW) pump Dower gives rise to Raman gain in the fibre under test and thus Raman amplification of both outbound OTDR pulse and returning backscattered signals occurs. Returning backscattered signals at the pump wavelength are filtered out before they reach the OTDR receiver by the WDM coupler 3, which should have low cross talk. Spontaneous Raman backscatter, which occurs over a range of wavelengths, is filtered out the 7 nm band pass interference filter 7. A Hewlett Packard OTDR was selected for the embodiment because it automatically subtracts the mean received light level from the measurements, and thus it is able to cope with residual pump and Raman backscattered CW signals that reach the OTDR. Other types of OTDRs may be employed if the filtering is adequate, or if they possess similar normalising functions.

Figure 2A:
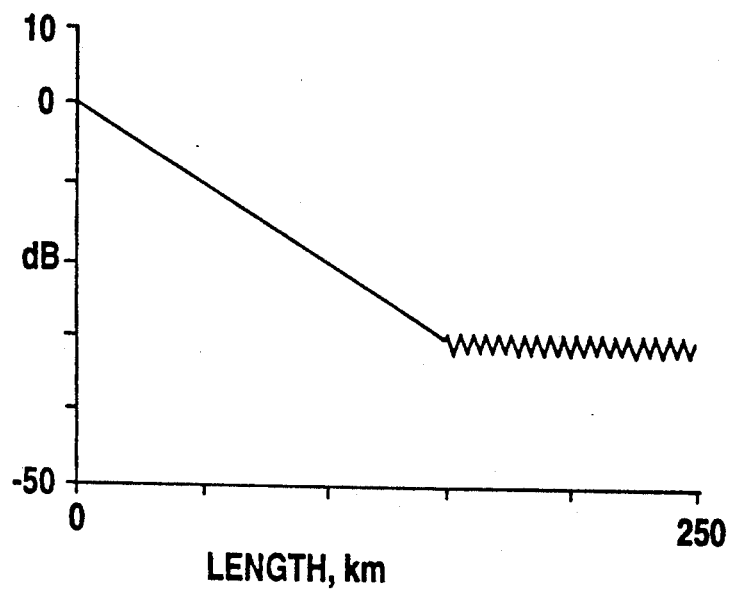
FIGS. 2a and 2b show OTDR traces respectively without and with the invention.
Figure 2B:
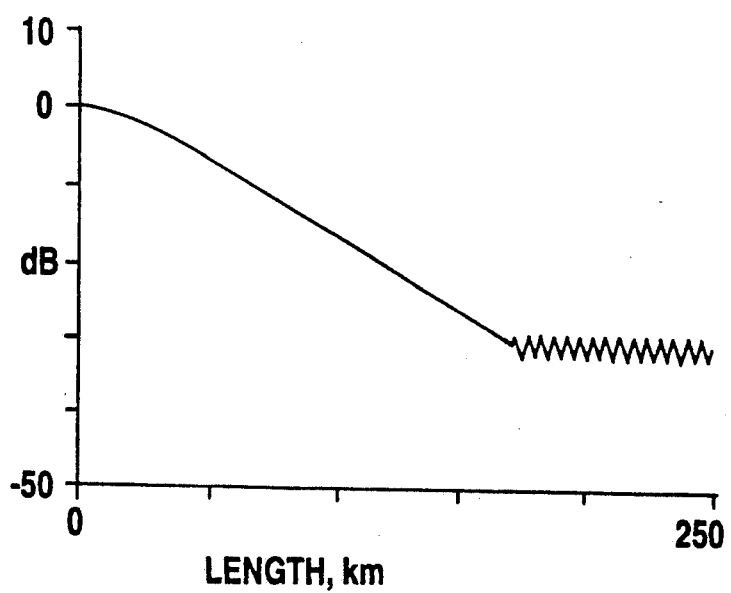

In the fibre under test, which was initially a 0.2 dB/Km standard step-index single mode fibre with a core diameter of 10 microns and an index step of 0.005, Raman gain of the order of 4 dB for a pump power of 100 mW, corresponding to an additional 20 Km fibre measurement distance, occurs. However a significant factor is that the gain does not occur in a short length of fibre but is distributed over the length of fibre for which the pump power produces significant excitation, which may be regarded as over the first 50 to 100 Km for this type of fibre or over the whole length of fibre if shorter than this. FIGS. 2a and 2b shown the respective OTDR traces obtained with the pump 6 turned off (FIG. 2a) and turned on (FIG. 2b).

FIG. 2a is a typical OTDR trace with the power failing to a substantially steady background level given by the OTDR receiver noise floor. When the pump is turned on the trace modifies to that shown in FIG. 2b so that instead of the power falling off, it initially remains substantially constant (or it may increase slightly or decrease at a much lower rate depending upon the precise fibre and pump parameters) for a time corresponding to about 50 to 100 Km of fibre. The higher level of returning signal reflects the higher pulse level in the fibre due to Raman amplification. It should be noted that both the outbound and returning signals are amplified rather than just outbound signals, and thus the signals reach and can be detected from further along the fibre.

Since the Raman gain is distributed over at least the first part of the fibre under test the consequences for the dynamic range of the receiver are different from having a straightforward increase in launch Dower. Due to the distributed or gradual nature of the amplification, the signals outbound and returning are undergoing both loss due to distance travelled and simultaneous Raman amplification. The result of this is that there is no surge of power that results in any substantial increase in the maximum returned power level at the OTDR but rather fall off is delayed. So although the range of the OTDR is extended there is little or no additional demand made on the processing dynamic range of the OTDR. Other (ie non Raman) amplification that occurs over a significant length of fibre, termed herein 'distributed' amplification could be used to give a similar effect.

The fibre under test may be of a different type to that mentioned above. In the embodiment shown in FIG. 1 the fibre under test was changed to a dispersion shifted fibre with a triangular profile, core diameter of 10 microns and index step of 0.009. In this case under the same conditions the Raman gain increased to 5 dB. Further increases in gain can be obtained for increased pump power, as shown in FIG. 3 where one way advantage over umpumped step-index figure is plotted versus pump power, the upper line is the dispersion shifted fibre and the lower line is the step-index fibre. From FIG. 2 it can be seen that doubling the power to 200 mW approximately doubles the dynamic range advantage. Dispersion shifted fibre also has a higher backscatter coefficient and a further 2 dB range advantage results from this, which is shown more clearly in FIG. 4.

Figure 4B:
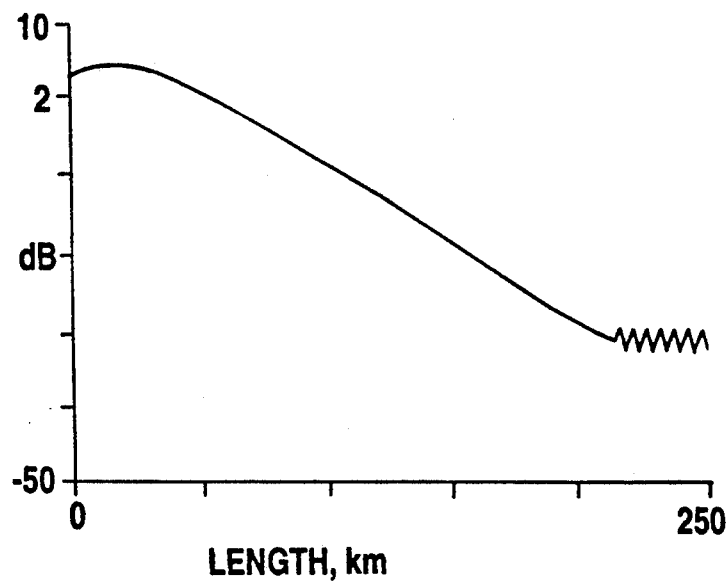

FIG. 4a shows the pumped OTDR trace at 100mW for dispersion shifted fibre in which the increase in OTDR range is 25 Km (5 dB) and in addition the level of backscatter trace at the launch end is about 2 dB higher compared with step-index fibre, corresponding to a further 10 Km range advantage. FIG. 4b shows a trace for 200 mW input pump power to dispersion shifted fibre. The increase in OTDR range for this condition is 50 Km (10 dB one-way increase), that is it enables a measurement range of 40 dB thus enabling single end fault location over 40 dB spans. If the Raman pump power were increased to 400 mW a one-way optical range of 50 dB would be obtainable.

It should be noted from FIGS. 2b, 4a and 4b that at pump levels up to 200 mW the net gain (Raman gain minus fibre loss) on detection does not exceed more than about +3 dB at any point along the fibre so that the OTDR receiver requires at most only another 12 dB additional electrical dynamic range, for example an increase from 120 dE (for a current 30 dB optical range kit) to 132 dB but yielding about 40 dB optical measurement range which by conventional techniques would require 160 dB electrical dynamic range.

The use of Raman gain also means thaw the OTDR unit is operable at different wavelengths. Different transmitter (pulse) wavelengths may be used as long as an appropriate shorter pump wavelength is available. For operation in the 1300 nm window the wavelength difference required is about 80 nm. With the availability of high power semiconductor lasers that can be used in pump modules to provide of the order of 100 to 200 mW output power, or possibly more, the assembly may be maintained compact. Examples of suitable pump lasers include Grinsch MQW laser diodes or VIPS structure lasers, such as those sold by OKI of Tokyo.

It will, be noted that the first part of the OTDR trace of FIGS. 2b, 4a and 4b where there is Raman gain does not correspond to the usual trace. This may be compensated for by comparison with an earlier trace or the system may be software controlled to take a first trace without pumping and to scale this to provide an equivalent trace for the initial span of fibre, to be used in place of the same span when the pump is operated.

A particular advantage of using the fibre as an amplifier is that pulses of any duration can be amplified, for example from microsecond to picosecond lengths, which is more versatile than amplification provided by semiconductor laser amplifiers which at present cannot provide sufficient power amplification for pulses over 100 picoseconds.

We claim:

1. An optical time domain reflectometer comprising:

a source of optical pulses, means for launching the optical pulses into a waveguide to be tested, and means for optically pumping the waveguide with cw light to produce gain at the optical pulse wavelength, said gain being distributed over a substantial length of the waveguide including at least a portion of the waveguide closest to the reflectometer.

2. An optical in reflectometer according to claim 1 in which the optical pulses experience gain when travelling in the outward direction and in the return direction along the waveguide.

3. An optical time domain reflectometer according to claim 1 in which the gain is provided over at least 1 kilometre of a waveguide under test.

4. An optical time domain reflectometer as claimed in claim 3 wherein the gain is provided over at least 5 kilometres of the waveguide.

5. An optical time domain reflectometer as claimed in claim 4 wherein the gain is provided over at least 10 kilometres of the waveguide.

6. An optical time domain reflectometer according to claim 1 in which the gain is distributed such that in the returning signal to the OTDR the gain is substantially balanced by losses.

7. An optical time domain reflectometer according to claim 1 in which the net gain resulting from distributed gain and losses is at most +3 dB.

8. An OTDR according to claim 1 in which the gain is produced by Raman amplification.

9. An OTDR according to claim 1 in which the pumping power is at least 100 mW.

10. An OTDR according to claim 1 in which the pulse source comprises a semiconductor laser.

11. An OTDR according to claim 1 in which the means for optically pumping comprises a semiconductor laser.

12. A method of increasing the measurement range of an optical time domain reflectometer, the method comprising:

launching an optical pulse from an optical time domain reflectometer into a waveguide to be tested an optically pumping the waveguide with cw light to induce gain of the pulses over a substantial length of the waveguide including at least a portion of the waveguide closest to the reflectometer.

13. A method according to claim 12 wherein the pulses experience gain when travelling in the outward direction and in the return direction along the waveguide.

14. A method according to claim 12 in which the pumping is at a power level such that in a portion of the waveguide the gain is substantially balanced by losses.

15. A method according to claim 12 in which the net gain of a signal returning to the OTDR is a maximum of 3+dB.

16. A method according to claim 12 in which the optical pumping is by a semiconductor laser housed in the reflectometer.

17. A method according to claim 12 in which the gain is produced by Raman amplification.

18. A method as claimed in claim 12 wherein the gain is provided over at least 1 kilometre of a waveguide under test.

19. A method as claimed in claim 18 wherein the gain is provided over at least 5 kilometres of the waveguide.

20. A method as claimed in claim 19 wherein the gain is provided over at least 10 kilometres of the waveguide.

21. An improved optical time domain reflectometer apparatus for use in testing an extended length of optical waveguide under test with optical pulses of a first wavelength, said apparatus comprising:

a continuous wave optical pump signal source of optical signals having a second wavelength suitable for effecting continuous Raman amplification of said optical pulses within said waveguide to be tested over an extended length extending outwardly from the proximal end toward the distal end of the waveguide;

a wavelength division coupler coupling said continuous wave signals of the second wavelength into the waveguide under test; and a narrow band optical filter connected to selectively pass said pulses of a first wavelength into said waveguide under test via said coupler and for passing in the opposite direction substantially only optical signals of said first wavelength.

22. An improved method of optical time domain reflectometry for use in testing an extended length of optical waveguide under test with optical pulses of a first wavelength, said method comprising:

coupling into said waveguide continuous wave optical pump signals of a second wavelength suitable for effecting continuous Raman amplification of said optical pulses within said waveguide to be tested over an extended length extending outwardly from the proximal end toward the distal end of the waveguide; and using a narrow band optical filter to selectively pass said pulses of a first wavelength into said waveguide under test and for passing in the opposite direction substantially only optical signals of said first wavelength.

* * * * *